US011194996B2

(12) United States Patent
Zhou et al.

(10) Patent No.: US 11,194,996 B2
(45) Date of Patent: Dec. 7, 2021

(54) METHOD OF UNLOCKING CONTROL, MOBILE TERMINAL, AND COMPUTER STORAGE MEDIUM

(71) Applicant: GUANGDONG OPPO MOBILE TELECOMMUNICATIONS CORP., LTD., Guangdong (CN)

(72) Inventors: Yibao Zhou, Guangdong (CN); Haiping Zhang, Guangdong (CN)

(73) Assignee: SHENZHEN HEYTAP TECHNOLOGY CORP., LTD., Shenzhen (CN)

( * ) Notice: Subject to any disclaimer, the term of this patent is extended or adjusted under 35 U.S.C. 154(b) by 130 days.

(21) Appl. No.: 16/723,502

(22) Filed: Dec. 20, 2019

(65) Prior Publication Data

US 2020/0125834 A1   Apr. 23, 2020

Related U.S. Application Data

(63) Continuation of application No. PCT/CN2018/096825, filed on Jul. 24, 2018.

(30) Foreign Application Priority Data

Jul. 28, 2017   (CN) .......................... 201710632724.1

(51) Int. Cl.
  *G06K 9/00*       (2006.01)
  *G06F 21/32*      (2013.01)
  *H04M 1/72463*    (2021.01)

(52) U.S. Cl.
  CPC ......... *G06K 9/00255* (2013.01); *G06F 21/32* (2013.01); *G06K 9/00288* (2013.01); *H04M 1/72463* (2021.01)

(58) Field of Classification Search
  CPC .......... G06K 9/00255; G06K 9/00288; H04M 1/72463; G06F 21/32
  See application file for complete search history.

(56) References Cited

U.S. PATENT DOCUMENTS 8,396,265 B1    3/2013  Ross et al.
2010/0189316 A1 7/2010  Walch
(Continued)

FOREIGN PATENT DOCUMENTS

CN    103577789 A    2/2014
CN    105046127 A    11/2015
(Continued)

OTHER PUBLICATIONS

International search report issued in corresponding international application No. PCT/CN2018/096825, dated Oct. 24, 2018 (2 pages).

(Continued)

*Primary Examiner* — Md K Talukder
(74) *Attorney, Agent, or Firm* — Young Basile Hanlon & MacFarlane, P.C.

(57) ABSTRACT

An unlocking control method and a related product, the method may include: acquiring, by means of a proximity sensor of a mobile terminal, the distance between a face and the mobile terminal; determining a target biometrics module, the target biometrics module being any one biometrics module to be adjusted to a matching threshold value within a current biometrics apparatus; determining, according to the distance, a target matching threshold value corresponding to the target biometrics module, and adjusting a matching threshold value of the target biometrics module to the target matching threshold value; and performing unlocking control according to the target matching threshold value.

18 Claims, 6 Drawing Sheets

(56) References Cited

U.S. PATENT DOCUMENTS

| | | | |
|---|---|---|---|
| 2013/0015946 A1* | 1/2013 | Lau | G06F 21/32 340/5.2 |
| 2015/0358790 A1* | 12/2015 | Nasserbakht | G06F 16/128 455/414.1 |
| 2016/0104029 A1* | 4/2016 | Takagi | G06K 9/00006 382/124 |
| 2016/0180068 A1 | 6/2016 | Das et al. | |
| 2016/0275334 A1* | 9/2016 | Hama | G06F 21/32 |
| 2017/0142589 A1* | 5/2017 | Park | H04W 12/086 |
| 2018/0173863 A1* | 6/2018 | Andersson | G06K 9/00067 |
| 2018/0239977 A1* | 8/2018 | Matsimanis | G06K 9/00288 |
| 2020/0125834 A1* | 4/2020 | Zhou | G06K 9/00288 |

FOREIGN PATENT DOCUMENTS

| | | | |
|---|---|---|---|
| CN | 105468956 A | 4/2016 | |
| CN | 105653922 A | 6/2016 | |
| CN | 105787477 A | 7/2016 | |
| CN | 105912915 A | 8/2016 | |
| CN | 106250751 | * 12/2016 | G06F 21/34 |
| CN | 106250751 A | 12/2016 | |
| CN | 106599875 A | 4/2017 | |
| CN | 107516032 A | 12/2017 | |

OTHER PUBLICATIONS

First Office Action from China patent office in a counterpart Chinese patent Application 201710632724.1, dated Apr. 19, 2019 (12 pages).
European search report, EP18837392, dated May 7, 2020 (7 pages).
Communication pursuant to Article 94(3) EPC for EP Application 18837392.2 dated May 25, 2021. (4 pages).
Indian Examination Report for IN Application 201917052525 dated Jul. 29, 2021. (6 pages).

* cited by examiner

METHOD OF UNLOCKING CONTROL, MOBILE TERMINAL, AND COMPUTER STORAGE MEDIUM

CROSS-REFERENCE TO RELATED APPLICATION(S)

The present application is a continuation application of International Patent Application No. PCT/CN2018/096825, filed on Jul. 24, 2018, which claims priority to Chinese Patent Application No. 201710632724.1, filed on Jul. 28, 2017, the entire contents of both of which are hereby incorporated by reference in their entireties.

TECHNICAL FIELD

The present disclosure relates to the field of mobile terminals, and in particular to a method of unlocking control, a mobile terminal, and a computer-readable non-transitory storage medium.

BACKGROUND

As technologies about mobile terminals continuously develop, usage of a mobile terminal, such as a mobile phone, a computer, a tablet, and the like, has become increasingly popular, and biometric identification is used for unlocking. The biometric identification includes fingerprint identification, iris recognition, sclera recognition, face identification, voiceprint recognition, vein recognition, and the like.

SUMMARY

According to a first aspect of the present disclosure, a method of unlocking control is provided, the method includes: acquiring a distance between a face of a user and the mobile terminal through a proximity sensor of the mobile terminal; determining a target biometric identification module, wherein the target biometric identification module is any biometric identification module of the biometric identification apparatus and has a matching threshold to be adjusted; determining a target matching threshold corresponding to the target biometric identification module based on the acquired distance, adjusting the matching threshold of the target biometric identification module to the target matching threshold; and controlling the unlocking based on the target matching threshold.

According to a second aspect of the present disclosure, a mobile terminal is provided. The mobile terminal includes a processor, a proximity sensor connected to the processor, a non-transitory memory, and a target biometric identification module. The target biometric identification module is any biometric identification module of a current biometric identification apparatus and has a matching threshold to be adjusted. The proximity sensor is configured to acquire a distance between a face of a user and the mobile terminal. The non-transitory memory is configured to store the matching threshold corresponding to the target biometric identification module. The processor is configured to determine a target matching threshold corresponding to the target biometric identification module based on the acquired distance, and adjust the matching threshold of the target biometric identification module to the target matching threshold; and to control unlocking based on the target matching threshold.

According to a third aspect of the present disclosure, a computer-readable non-transitory storage medium is provided, computer-readable non-transitory storage medium, configured to store a computer program, wherein the computer program enables the computer to execute operations of: detecting a distance between a face of a user and the mobile terminal through a proximity sensor of the mobile terminal; storing a target matching threshold corresponding to a target biometric identification module according to the detected distance; and controlling the unlocking based on the target biometric identification module and the target matching threshold.

BRIEF DESCRIPTION OF DRAWINGS

In order to more clearly illustrate technical solutions of embodiments of the present disclosure and technical solutions in the related art, drawings required to be used in the embodiments will be briefly described in the following. Evidently, the drawings in the following description are some embodiments of the present disclosure, and according to these drawings, those ordinarily skilled in the art can further obtain other drawings without any creative work.

DETAILED DESCRIPTION

Figure 1:
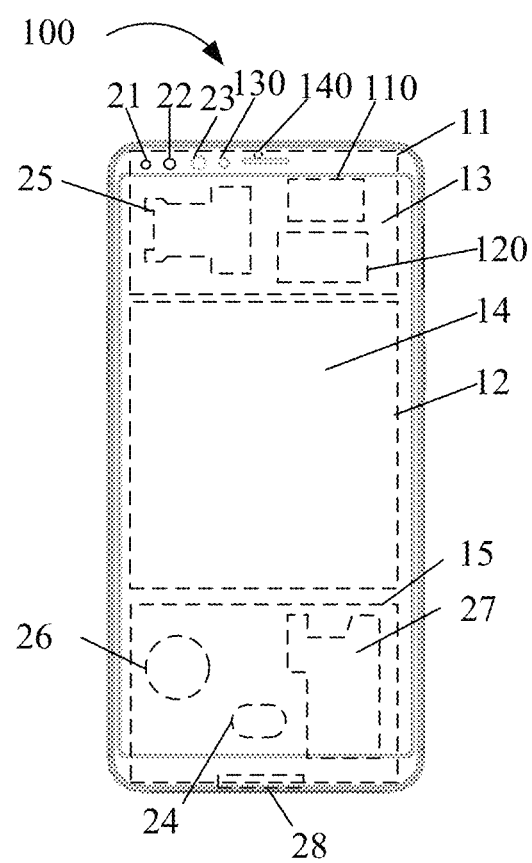
FIG. 1 is a structural schematic view of a mobile terminal according to an embodiment of the present disclosure.

In order to allow the skilled in the related art to understand the present disclosure better, the drawings will be incorporated with the embodiments of the present to illustrate the technical solutions of the present disclosure clearly and comprehensively. On the bases of the embodiments of the present disclosure, the ordinary skilled in the art may obtain other embodiments without any creative work, and the obtained other embodiments are within the scope of the present disclosure.

Terms used in the specification, claims, and the drawings, such as "first", "second", and the like, are for purposes to distinct different objects only, but not to define a specific sequence. In addition, terms, such as "include", "comprise", and other transformed expressions, indicates non-exclusive inclusion. For example, a process, a method, a system, a product, or a device including a series of operations or units is not limited to include the listed operations and units only, but may alternatively include unlisted operations and units, or may alternatively include other operations and units intrinsically contained in the process, in the method, in the product or the device.

Referring to an "embodiment" as mentioned in the present disclosure, particular features, structures, or properties may be included in at least one embodiments of the present disclosure. The "embodiments" appeared in any sentence of the present disclosure may not refer to a same embodiment, and may not refer to an alternative embodiment or an embodiment exclusive to or independent from other embodiments. It should be explicitly and implicitly understood by the skilled in the art that, the embodiments of the present disclosure may be combined with other embodiments.

Mobile terminals involved in the embodiments of the present disclosure may include a hand-held device with a wireless communication function, a vehicle equipment, a wearable device, a computing device, or other process equipments connected to a wireless modem, and various types of user equipments (UE), a mobile station, a terminal device, and the like. To give an easy description, the above-mentioned devices and equipments are generically called mobile terminals. The embodiments of the present disclosure will be illustrated in details hereafter.

According to a first aspect of the present disclosure, a method of unlocking control is provided, the method includes: acquiring a distance between a face of a user and the mobile terminal through a proximity sensor of the mobile terminal; determining a target biometric identification module, wherein the target biometric identification module is any biometric identification module of the biometric identification apparatus and has a matching threshold to be adjusted; determining a target matching threshold corresponding to the target biometric identification module based on the acquired distance, adjusting the matching threshold of the target biometric identification module to the target matching threshold; and controlling the unlocking based on the target matching threshold.

In some embodiments, the determining a target matching threshold corresponding to the target biometric identification module based on the acquired distance includes: acquiring L verification records of the target biometric identification module at the acquired distance from a verification history; acquiring L matching values corresponding to each of the L verification records; and determining the target matching threshold based on the L matching values. L is an integer greater than 1.

In some embodiments, the determining a target matching threshold corresponding to the target biometric identification module based on the acquired distance includes: acquiring a first absolute value of a difference value between a predefined distance of the target biometric identification module and the acquired distance; and determining the target matching threshold based on the first absolute value.

In some embodiments, the determining the target biometric identification module includes: acquiring an environment parameter through an environment sensor of the mobile terminal; and determining the target biometric identification module based on the environment parameter.

In some embodiments, the determining the target biometric identification module further includes: acquiring a scene parameter of the mobile terminal; and determining the target biometric identification module based on the scene parameter and the environment parameter.

In some embodiments, the method further includes: acquiring M verification records of the target biometric identification module corresponding to the scene parameter and the environment parameter from a verification history; acquiring N verification records each having a matching value greater than a target threshold from the M verification records; and determining the predefined distance based on the acquired distance corresponding to each of the N verification records. M is an integer greater than 1, and N is a positive integer less than M.

In some embodiments, the controlling the unlocking based on the target matching threshold includes: collecting biometric information through the target biometric identification module; acquiring a matching value between the biometric information and predefined biometric information; and initiating predefined biometric identification module for verification when the matching value is less than the target matching threshold and greater than a predefined target threshold. The predefined target threshold is less than the target matching threshold.

In some embodiments, the method further includes: acquiring a second absolute value of a difference value between the matching value and the target matching threshold; and determining the predefined biometric identification module based on the second absolute value.

In some embodiments, during determining the target matching threshold based on the L matching values, the target matching threshold is determined to be one of a mean of the L matching values, a minimum value of the L matching values, and a matching value corresponding to a longest time consumed for verification in the L matching values.

According to a second aspect of the present disclosure, a mobile terminal is provided. The mobile terminal includes a processor, a proximity sensor connected to the processor, a non-transitory memory, and a target biometric identification module. The target biometric identification module is any biometric identification module of a current biometric identification apparatus and has a matching threshold to be adjusted. The proximity sensor is configured to acquire a distance between a face of a user and the mobile terminal. The non-transitory memory is configured to store the matching threshold corresponding to the target biometric identification module. The processor is configured to determine a target matching threshold corresponding to the target biometric identification module based on the acquired distance, and adjust the matching threshold of the target biometric identification module to the target matching threshold; and to control unlocking based on the target matching threshold.

In some embodiments, the non-transitory memory is further configured to store a verification history. When determining the target matching threshold corresponding to the target biometric identification module based on the acquired distance, the processor is configured to: acquire L verification records of the target biometric identification module at the acquired distance from the verification history; acquire a matching value corresponding to each of the L verification records, such that L matching values are acquired; and determine the target matching threshold based on the L matching values. L is an integer greater than 1.

In some embodiments, the non-transitory memory is further configured to store a predefined distance of the target biometric identification module. When determining the target matching threshold corresponding to the target biometric identification module based on the acquired distance, the processor is configured to: acquire a first absolute value of a difference value between the predefined distance and the acquired distance; and determine the target matching threshold based on the first absolute value.

In some embodiments, the mobile terminal further includes an environment sensor connected to the processor; the environment sensor is configured to acquire an environment parameter; and the processor is further configured to determine the target biometric identification module based on the environment parameter.

In some embodiments, when the processor is further configured to determine the target biometric identification module based on the environment parameter, the processor is further configured to: acquire a scene parameter of the mobile terminal; and determine the target biometric identification module based on the scene parameter and the environment parameter.

In some embodiments, the processor is further configured to: acquire M verification records of the target biometric identification module corresponding to the scene parameter and the environment parameter from the verification history; acquire N verification records each having a matching value greater than a target threshold from the M verification records; and determine a predefined distance based on the acquired distance corresponding to each of the N verification records. M is an integer greater than 1, and N is a positive integer less than M.

In some embodiments, the non-transitory memory is further configured to store a predefined target threshold, a predefined biometric identification module corresponding to the target biometric identification module, and predefined target biometric information corresponding to the target biometric identification module. The predefined target threshold is less than the target matching threshold. The target biometric identification module is configured to collect biometric information. When the processor is configured to control unlocking based on the target matching threshold, the processor is further configured to: acquire a matching value between the biometric information and the predefined biometric information; and initiate the predefined biometric identification module for verification when the matching value is less than the target matching threshold and greater than the predefined target threshold.

In some embodiments, the target matching threshold is determined to be one of a mean of the L matching values, a minimum value of the L matching values, and a matching value corresponding to a longest time consumed for verification in the L matching values.

According to a third aspect of the present disclosure, a computer-readable non-transitory storage medium is provided. The computer-readable non-transitory storage medium may be configured to store a computer program. The computer program enables the computer to execute the operations of: detecting a distance between a face of a user and the mobile terminal through a proximity sensor of the mobile terminal; storing a target matching threshold corresponding to a target biometric identification module according to the detected distance; and controlling the unlocking based on the target biometric identification module and the target matching threshold.

In some embodiments, the target matching threshold is determined by acquiring L verification records of the target biometric identification module at the acquired distance from a verification history, wherein L is an integer greater than 1; acquiring L matching values corresponding to each of the L verification records; and determining the target matching threshold based on the L matching values.

In some embodiments, the target matching threshold is determined by: acquiring a first absolute value of a difference value between a predefined distance of the target biometric identification module and the acquired distance; and determining the target matching threshold based on the first absolute value.

Embodiments of the present disclosure may provide a method of unlocking control and related products, such that a technical problem of low identification rate caused by a fixed verification algorithm may be solved.

Embodiments of the present disclosure may provide a mobile terminal, arranged with a biometric identification apparatus. The biometric identification apparatus includes at least a fingerprint identification module, an iris recognition module, and a face identification module. The biometric identification apparatus may further include a voice recognition module, a vein recognition module, a sclera recognition module, and other biometric identification modules. The fingerprint identification module may be a fingerprint sensor module, the iris recognition module may include an infrared light source and an infrared camera, and the face recognition module may include a generic camera module, such as a front camera. The embodiments of the present disclosure may be illustrated in details with reference to the drawings.

As shown in FIG. 1, a structural schematic view of a mobile terminal according to an embodiment of the present disclosure is provided. The mobile terminal 100 may include: a shell 11, a touch screen 12, a main board 13, a battery 14, and a sub-plate 15. The main board 13 is arranged with an infrared light source 21, an infrared camera 22, a front camera 23, a processor 110, a non-transitory memory 120, a proximity sensor 130, an environment sensor 140, a card tray 25 for a subscriber identity module (SIM) and the like. The sub-plate 15 is arranged with an oscillator 26, an integral acoustic chamber 27, a VOOC fast charging interface 28, and a fingerprint sensor module 24. The infrared light source 21 and the infrared camera 22 may serve as the iris recognition module for the mobile terminal 100. The front camera may serve as the face identification module for the mobile terminal 100. The fingerprint sensor module 24 may serve as the fingerprint identification module for the mobile terminal 100.

When the biometric identification apparatus is the iris recognition module, the infrared light source 21 may be configured to emit infrared light to irradiate an iris of a user, and the light may be reflected. The infrared camera 22 may be configured to collect the reflected light to generate an iris image. The processor 110 may obtain the iris image, and then process the iris image including operations of evaluating quality of the iris image, iris location (including rough location and accurate location), pre-processing of the iris, collection of feature points of the iris, generation of an iris template, and the like. The generated iris template may be the biometric information to be verified.

The proximity sensor 130 may be typically arranged on two opposing sides of a loudspeaker, or received in a chamber of the loudspeaker. At least one of the touch screen and a backlight may be adjusted based on a distance between a user to be verified and the mobile terminal 100, such that an unintended activation may be reduced, and power may be saved. For example, when the user is answering or making a call, the mobile terminal 100 may be moved close to a head. The proximity sensor may detect that the distance between the user and the mobile terminal 100 is less than or equal to a predefined threshold, and the backlight of the touch screen may be instructed to be switched off. When the proximity sensor detects that the distance between the user and the mobile terminal 100 is greater than the predefined threshold, the backlight of the touch screen may be instructed to be switched on.

The mobile terminal 100 as shown in FIG. 1 may execute following operations.

In the embodiments of the present disclosure, the proximity sensor 130 may be configured to obtain a distance between a face and the mobile terminal 100. The non-transitory memory 120 may be configured to store a matching threshold corresponding to a target biometric identification module. The processor 110 may be configured to determine a target matching threshold corresponding to the target biometric identification module based on the distance, and to adjust the matching threshold corresponding to the target biometric identification module to the target matching threshold. The processor 110 may further be configured to control unlocking of the mobile terminal based on the target matching threshold.

The target biometric identification module may be any biometric identification module in a current biometric identification apparatus and have the matching threshold to be adjusted. A matching value may refer to a matching score detected by the target biometric identification module during performing a current verification. As the matching value may be related to the distance, by adjusting the matching threshold of the target biometric identification module based on the distance, the processor may accurately determine whether the detected matching value reaches the adjusted matching threshold. The present embodiment does not limit the target biometric identification module or an adjustment strategy of the matching threshold of the target biometric identification module.

Each biometric identification module is set with a matching threshold. When a matching value between biometric information collected for a current verification and predefined biometric information is greater than or equal to the matching threshold, the verification may be successful, and the mobile terminal may be unlocked. For example, the matching threshold for the fingerprint identification module may be 80%, the matching threshold for the iris recognition module may be 85%, the matching threshold for the face recognition module may be 82%, and the like.

In an embodiment, the environment sensor 140 may be configured to acquire an environment parameter. The processor 110 may further be configured to determine the target biometric identification module based on the environment parameter.

The environment parameter may include at least one selected from the group consisting of: light intensity, a temperature, humidity, electromagnetic interference, a geographic location, and the like. The present embodiment does not limit the environment parameter. Different environment parameters may require different performance parameters for the biometric identification module. For example, the face recognition module may require high intensity of light, and higher pixels of a camera, higher accuracy of the recognition. Moisturization of a finger may impact the fingerprint identification module collecting a fingerprint image. That is, based on the environment parameter acquired by the environment sensor 140, the target biometric identification module may be determined, such that the identification rate and flexibility of verification may be improved.

Alternatively, the processor 110 may further be configured to acquire a scene parameter. The target biometric identification module may be determined based on the scene parameter. That is, based on page information of a current application or an application invoked in a background, the scene parameter may be acquired to determine the target biometric identification module, such that the identification rate and flexibility of verification may be improved. Further, by adjusting the matching threshold of the target biometric identification module only, but not that of all biometric identification module arranged in the mobile terminal 100, power consumption of the mobile terminal 100 may be reduced, and duration of power supply of the entire mobile terminal 100 may be improved.

The scene parameter may include at least one selected from the group consisting of: a type of an application, occupancy of network speed, data transmission, a type of the data, and the like. To be noted that, different scene parameters may require different performance parameters for the biometric identification module. The performance parameter may include verification time, the matching value, power consumption, and the like. For example, a scenario of activating the mobile terminal may tend to require faster verification, and a scenario of paying may tend to require a high matching value.

In an embodiment, when the processor 110 is configured to determine the target biometric identification module based on the environment parameters, the processor 110 is specifically configured to determine the target biometric identification module based on both the scene parameter and the environment parameter.

In other words, determining the biometric identification module based on the environment parameter and the scene parameter of the mobile terminal 100 may improve accuracy of determining the target biometric identification module, further improving the identification rate and flexibility of verification.

In an embodiment, the non-transitory memory 120 may further be configured to store a verification history. When the processor 110 is configured to determine the target matching threshold corresponding to the target biometric identification module based on the acquired distance, the processor 110 is specifically configured to: acquire L verification records of the target biometric identification module at the acquired distance from the verification history; acquire L matching values corresponding to each of the L verification records; and determine the target matching threshold based on the L matching values.

L may be a positive integer greater than 1. The verification history may include the performance parameters, such as time consumed for each verification, the matching value to the biometric information for each verification, power consumption of the biometric identification module for each verification, and the like. The present embodiment does not limit a mathematic expression of the performance parameters. The performance parameters may have decimals or may be represented as a percentage.

In the embodiments of the present disclosure, the verification history may be searched to find the verification records of the target biometric identification module at the acquired distance, and matching values corresponding to the found verification records may be acquired. By analyzing the acquired matching values, the target matching threshold of the target biometric identification module corresponding to the acquired distance may be determined. The present embodiment does not limit the determination of the target matching threshold. The target matching threshold may be a mean or a minimum value of the matching values of the verification records, or may be the matching value corresponding to a longest time consumed for verification.

To be a example, when the mobile terminal 100 includes the face recognition module and the iris recognition module, and a current distance is 8 cm, meaning the distance between the face of the user to be verified and the mobile terminal 100 is 8 cm, there may be 3 verification records corresponding to 8 cm. Table 1 illustrates the 3 verification records and the matching values corresponding to the two recognition modules. It may be calculated that a mean matching value of the face recognition module is 62%, and a mean matching value of the iris recognition module is 58.6%. 62% may be selected as the target matching threshold for the face recognition module when the distance between the face of the user to be verified and the mobile terminal 100 is 8 cm, and 58.6% may be selected as the target matching threshold for the iris recognition module when the distance between the face of the user to be verified and the mobile terminal 100 is 8 cm.

TABLE 1

| Verification Records Corresponding To 8 cm | Face Recognition Module | Iris Recognition Module |
|---|---|---|
| A first verification record | 60% | 50% |
| A second verification record | 56% | 66% |
| A third verification record | 70% | 60% |

In an embodiment, the non-transitory memory 120 may further be configured to store a predefined distance of the target biometric identification module. When the processor 110 determines the target matching threshold corresponding to the target biometric identification module based on the acquired distance, the processor 110 is specifically configured to acquire a first absolute value of a difference value between the predefined distance and the acquired distance, and to acquire the target matching threshold based on the first absolute value.

Each biometric identification module may correspond to a predefined distance. The predefined distance may be an optimum distance to collect the biometric information. The predefined distance may correspond to a target matching threshold. A difference between the acquired distance and the predefined distance may be obtained, and the matching threshold of the target biometric identification module may be adjusted to the target matching threshold based on the difference. Taking the predefined distance as an original, the closer the distant between the acquired distance and the predefined distance, the smaller the target matching threshold, and the further the distant between the acquired distance and the predefined distance, the smaller the target matching threshold. In this way, the identification rate and flexibility of verification may be improved.

As an example, when the predefined distance of the face recognition module is 6 cm, the predefined distance of the iris recognition module is 5 cm, and the current distance between a face and the mobile terminal 100 is 8 cm, the first absolute value corresponding to the face recognition module is 2 cm, and the first absolute value corresponding to the iris recognition module is 3 cm. Table 2 may illustrate the target matching threshold of the first absolute value corresponding to the face recognition module and that corresponding to the iris recognition module. By looking up in the table, when the current distance between the face and the mobile terminal 100 is 8 cm, the target matching threshold corresponding to the face recognition module is 60%, and the target matching threshold corresponding to the iris recognition module is 60%.

TABLE 2

| The first absolute value | Face Recognition Module | Iris Recognition Module |
|---|---|---|
| 1 cm | 50% | 40% |
| 2 cm | 60% | 50% |
| 3 cm | 70% | 60% |
| 4 cm | 70% | 70% |
| 5 cm | 80% | 80% |
| 6 cm | 90% | 70% |
| 7 cm | 80% | 60% |
| 8 cm | 70% | 50% |
| 9 cm | 60% | 40% |

In an embodiment, the processor 110 is further configured to determine the predefine distance, i.e., the optimum distance to collect the biometric information. To be specific, the processor 110 is configured to acquire M verification records of the target biometric identification module at each scene parameter and each environment parameter from the verification history; acquire N verification records each having the matching value greater than the target threshold from the M verification records; and determine the predefined distance based on the distance corresponding to each of the N verification records.

M is an integer greater than 1, N is a positive integer less than M, and the target threshold is not limited herein. It may be understood that, the M verification records of the target biometric identification module at each scene parameter and each environment parameter may be acquired from the verification history. Further, N verification records may be obtained based on the matching values of the M verification records. The predefined distance of the target biometric identification module may be determined based on the distance corresponding to each of the N verification records. That means an effect of the environment parameter and the scene parameter on the biometric identification module is considered, such that accuracy of determining the predefined distance may be improved.

In an embodiment, the non-transitory memory 120 may further be configured to store a predefined target threshold, a predefined biometric identification module corresponding to the target biometric identification module, and predefined target biometric information corresponding to the target biometric identification module. The predefined target threshold may be smaller than the target matching threshold. The target biometric identification module may be configured to collect biometric information. When the processor 110 is configured to control unlocking based on the target matching threshold, the processor 110 is further configured to acquire the matching value between the biometric information and the predefined target biometric information. When the matching value is less than the target matching threshold and greater than the predefined target threshold, the processor 110 may be configured to initiate the predefined biometric identification module.

The embodiment of the present disclosure does not limit the predefined biometric identification module. The predefined biometric identification module may be a biometric identification module set in advance, or may be one of historic multi-biometric identification modules, or may be the biometric identification module determined based on an absolute value of a difference value between the matching value and the target matching threshold. To be noted that, the predefined biometric identification module may include at least one biometric identification module to improve security of the verification.

Alternatively, the processor 110 may further be configured to acquire a second absolute value of a difference value between the matching value and the target matching threshold, and to determine the predefined biometric identification module based on the second absolute value.

In the present embodiment of the disclosure, a mapping relation between the second absolute value and the predefined biometric identification module may be stored in advance. The second absolute value of the difference between the matching value and the target matching threshold may be acquired at first, and then the predefined biometric identification module may be determined based on the mapping relation and the second absolute value, such that the accuracy of determination of the predefined biometric identification module may be improved.

For example, when the matching value is 0.706, and the target matching threshold is 0.8, the second absolute value of the difference between the matching value and the target matching threshold is 0.094. Table 3 illustrates a mapping relation between the second absolute value and the predefined biometric identification module. Accordingly, the fingerprint identification module may be determined as the predefined biometric identification module.

TABLE 3

| Range of the second absolute value | Predefined biometric identification module |
| --- | --- |
| [0, 0.2] | Fingerprint identification module |
| [0.2, 0.4] | Voice recognition module and face recognition module |
| [0.4, 0.6] | Voice recognition module and iris recognition module |
| [0.6, 0.8] | Fingerprint identification module, voice recognition module, and face recognition module |
| [0.8, 1.0] | Fingerprint identification module, voice recognition module, and iris recognition module |

The predefined target threshold may be a smallest threshold to initiate the predefined biometric identification module. In other words, when the matching value between the biometric information and the predefined target biometric information is greater than or equal to the target matching threshold, unlocking may be executed. When the matching value between the biometric information and the predefined target biometric information is smaller than the target matching threshold, but with the proviso of the matching value being greater than the predefined target threshold, an appropriate predefined biometric identification module may be initiated according to the mapping relation, and the verification may be performed through the initiated predefined biometric identification module. In such a way, flexibility of verification may further be improved.

For example, when the predefined biometric identification module is the finger print identification module, as light intensity is not sufficient, or the user is wearing eye contacts, the biometric information collected by the iris recognition module may fail in the verification. The fingerprint identification module may be initiated to collect a fingerprint image, instead of initiating the iris recognition module to collect the biometric information as predefined. In such a way, a convenient operation may be achieved, and efficiency and flexibility of the verification may be improved.

According to the embodiment of the present disclosure, the distance between the face and the mobile terminal 100 may be acquired, after determining the target biometric identification module, and the matching threshold of the target biometric identification module may be adjusted to the target matching threshold based on the distance. In such a way, the matching threshold may be modified dynamically, and the unlocking may be controlled based on the target matching threshold, such that verification rate and flexibility of unlocking may be improved.

Figure 2:
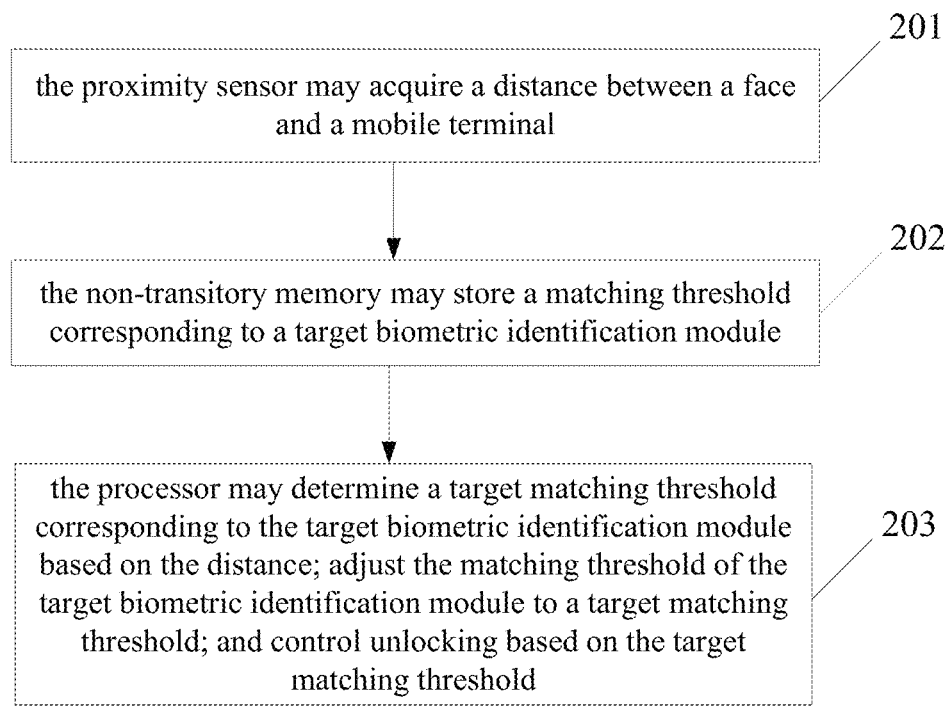
FIG. 2 is a flow chart illustrating a method of unlocking control according to an embodiment of the present disclosure.

In accordance with the embodiment shown in FIG. 2, FIG. 2 is a flow chart illustrating a method of unlocking control according to an embodiment of the present disclosure. The method may be adapted in the mobile terminal shown in FIG. 1. The mobile terminal may include a processor, a proximity sensor, a non-transitory memory, and a target biometric identification module. The proximity sensor, the non-transitory memory, and the target biometric identification module may be connected to the processor. The target biometric identification module may be any biometric identification module of the current biometric identification apparatus having a matching threshold to be adjusted.

At block 201, the proximity sensor may acquire a distance between a face and the mobile terminal.

At block 202, the non-transitory memory may store the matching threshold corresponding to the target biometric identification module.

At block 203, the processor may determine the target matching threshold corresponding to the target biometric identification module based on the distance; adjust the matching threshold of the target biometric identification module to the target matching threshold; and control unlocking based on the target matching threshold.

According to the embodiment of the present disclosure, the distance between the face and the mobile terminal may be acquired. After the target biometric identification module is determined, the matching threshold of the target biometric identification module may be adjusted to the target matching threshold based on the distance. In such a way, the matching threshold may be modified dynamically, and the unlocking may be controlled based on the target matching threshold, such that verification rate and flexibility of unlocking may be improved.

In an embodiment, the non-transitory memory may store a verification history. The processor determining the target matching threshold corresponding to the target biometric identification module based on the distance may include: the processor acquiring verification records of the target biometric identification module at the acquired distance from the verification history to obtain L verification records; the processor acquiring L matching values corresponding to each of the L verification records; and the processor determining the target matching threshold based on the L matching values. The L is an integer greater than 1.

In an embodiment, the non-transitory memory may store a predefined distance of the target biometric identification module. The processor determining the target matching threshold corresponding to the target biometric identification module based on the distance may include: the processor acquiring a first absolute value of a difference value between the predefined distance and the distance; and the processor determining the target matching threshold based on the first absolute value.

In an embodiment, the mobile terminal may further include an environment sensor connected to the processor. The method may further include: acquiring an environment parameter through the environment sensor; determining the target biometric identification module based on the environment parameter through the processor.

In an embodiment, the method may further include: acquiring a scene parameter of the mobile terminal through the processor; and determining the target biometric identification module based on the scene parameter and the environment parameter.

In an embodiment, the method further include: the processor acquiring M verification records of the target biometric identification module corresponding to each scene parameter and each environment parameter from the verification history; the processor acquiring N verification records each having the matching value greater than a target threshold from the M verification records; and the processor determining the predefined distance of the target biometric identification module based on the distance corresponding to each of the N verification records. M may be an integer greater than 1, and N may be a positive integer less than M.

In an embodiment, the non-transitory memory may store a predefined target threshold, a predefined biometric identification module corresponding to the target biometric identification module, and target biometric information corresponding to the target biometric identification module. The predefined target threshold is smaller than the target matching threshold. The target biometric identification module may collect biometric information. The processor controlling unlocking based on the target matching threshold may include: acquiring the matching value between the biometric information and the predefined target biometric information; and initiating the predefined biometric identification module when the matching value is less than the target matching threshold and greater than the predefined target threshold.

In an embodiment, the method may further include: the processor acquiring a second absolute value of a difference value between the matching value and the target matching threshold; and the processor determining the predefined biometric identification module to be initiated based on the second absolute value.

Figure 3:
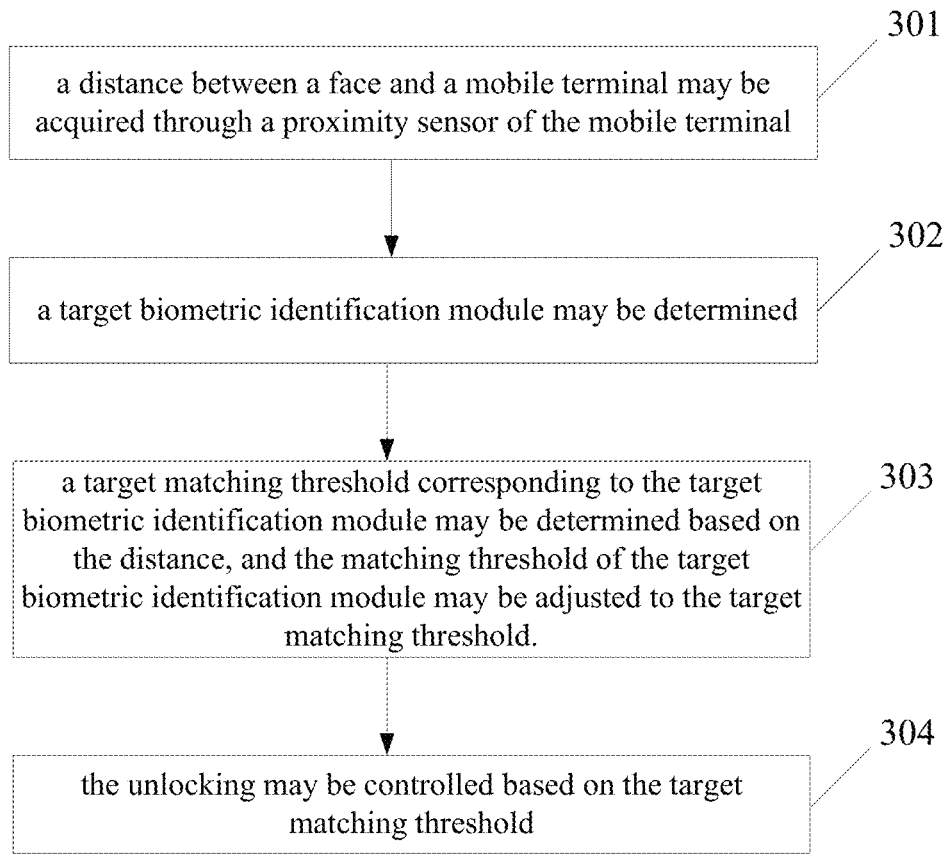
FIG. 3 is a flow chart illustrating another method of unlocking control according to an embodiment of the present disclosure.

In accordance with the embodiment shown in FIG. 1, FIG. 3 is a flow chart illustrating another method of unlocking control according to an embodiment of the present disclosure. The method may be adapted in the mobile terminal shown in FIG. 1. As shown in FIG. 3, following operations may be included.

At block 301, a distance between a face and the mobile terminal may be acquired through a proximity sensor of the mobile terminal.

At block 302, a target biometric identification module may be determined.

The target biometric identification module may be any biometric identification module of a current biometric identification apparatus having a matching threshold to be adjusted. A matching value may refer to a matching score detected by the target biometric identification module during performing a current verification. As the matching value may be related to the distance, by adjusting the matching threshold of the target biometric identification module based on the distance, the processor may accurately determine whether the detected matching value reaches the adjusted matching threshold. The present disclosure does not limit the target biometric identification module and a particular adjustment strategy.

In an embodiment, determining the target biometric identification module may include: acquiring an environment parameter through an environment sensor of the mobile terminal; and determining the target biometric identification module based on the environment parameter.

The environment parameter may include at least one of: light intensity, a temperature, humidity, electromagnetic interference, a geographic location, and the like. The present embodiment does not limit the environment parameter. Different environment parameters may require different performance parameters for the biometric identification module. In other words, the environment parameter of the mobile terminal may be acquired, and the target biometric identification module may be determined based on the environment parameter, such that the identification rate and flexibility of verification may be improved.

Alternatively, the method may further include: acquiring a scene parameter; and determining the target biometric identification module based on the scene parameter.

In an embodiment, the scene parameter may include at least one of: a type of an application, occupancy of network speed, data transmission, and a type of the data. To be noted that, different scene parameters may require different performance parameters for the biometric identification module. The performance parameter may include verification time, a matching value, power consumption, and the like.

In other words, the scene parameter of the mobile terminal may be acquired, and the target biometric identification module may be determined based on the scene parameter, such that the identification rate and flexibility of verification may be improved.

In an embodiment, the method may further include: acquiring the scene parameter of the mobile terminal through the processor; acquiring the environment parameter through the environment sensor; and determining the target biometric identification module based on the scene parameter and the environment parameter.

In other words, the target biometric identification module may be determined based on the environment parameter and the scene parameter of the mobile terminal. Accuracy of determination of the target biometric identification module may be improved, further improving the identification rate and flexibility of verification.

At block 303, a target matching threshold corresponding to the target biometric identification module may be determined based on the distance, and the matching threshold of the target biometric identification module may be adjusted to the target matching threshold.

In an embodiment, determining the target matching threshold corresponding to the target biometric identification module based on the distance may include: acquiring L verification records of the target biometric identification module at the acquired distance from the verification history; acquiring L matching values corresponding to each of the L verification records; and determining the target matching threshold based on the L matching values.

L may be an integer greater than 1. The verification history may include the performance parameters, such as time consumed for each verification, the matching value to the biometric information for each verification, power consumption of the biometric identification module for each verification, and the like. The present embodiment does not limit a mathematic expression of the performance parameters. The performance parameters may have decimals or may be represented as a percentage.

It may be understood that, the verification history may be searched, verification records of the target biometric identification module at the acquired distance may be found, and matching values corresponding to the found verification records may be acquired. By analyzing the matching values, and the target matching threshold of the target biometric identification module corresponding to the acquired distance may be determined. In such a way, accuracy of determination of the target matching threshold may be improved.

In an embodiment, determining the target matching threshold corresponding to the target biometric identification module based on the distance may include: acquiring a first absolute value of a difference value between the predefined distance of the target biometric identification module and the acquired distance; and determining the target matching threshold based on the first absolute value.

Each biometric identification module may correspond to a predefined distance. The predefined distance may be an optimum distance to acquire the biometric information. The predefined distance may correspond to a target matching threshold. A difference between the acquired distance and the predefined distance may be obtained, and the matching threshold of the target biometric identification module may be adjusted to the target matching threshold based on the difference. Taking the predefined distance as an original, the closer the user is distant between the acquired distance and the predefined distance, the smaller the target matching threshold, and the further the distant between the acquired distance and the predefined distance, the smaller the target matching threshold.

It may be understood that, the first absolute value of the difference value between the predefined distance and the acquired distance may be obtained at first, and then the target matching threshold may be determined based on a mapping relation between the first absolute value and the target matching threshold, such that the identification rate and flexibility of verification may be improved.

In an embodiment, the method may further include: acquiring M verification records of the target biometric identification module corresponding to each scene parameter and each environment parameter from the verification history; acquiring N verification records each having the matching values greater than a target threshold from the M verification records; and determining the predefined distance based on the distance corresponding to each of the N verification records.

M may be an integer greater than 1, and N may be a positive integer less than M.

It may be understood that, M verification records of the target biometric identification module corresponding to each scene parameter and each environment parameter may be acquired from the verification history; N verification records may be acquired based on the matching values of the M verification records; and the predefined distance of the target biometric identification module may be determined based on the distance corresponding to each of the N verification records. That means an effect of the environment parameter and the scene parameter on the biometric identification module is considered, such that accuracy of determination of the predefined distance may be improved.

At block 304, the unlocking may be controlled based on the target matching threshold.

According to the method of unlocking control as shown in FIG. 3, the distance between the face and the mobile terminal may be acquired, after determining the target biometric identification module, the matching threshold of the target biometric identification module may be adjusted to the target matching threshold. In such a way, the matching threshold may be modified dynamically, and the unlocking may be controlled based on the target matching threshold, such that the verification rate and flexibility of unlocking may be improved.

Figure 4:
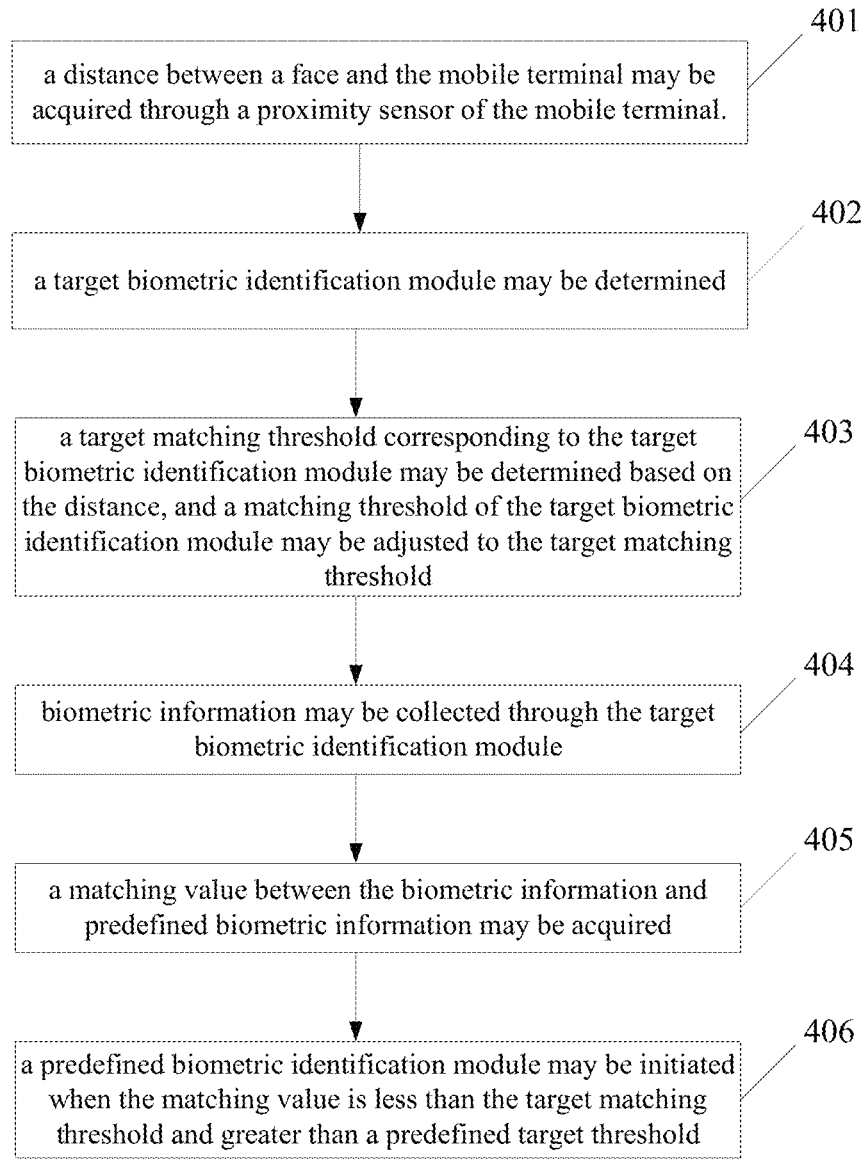
FIG. 4 is a flow chart illustrating still another method of unlocking control according to an embodiment of the present disclosure.

In accordance with the embodiment shown in FIG. 1, FIG. 4 is a flow chart illustrating still another method of unlocking control according to an embodiment of the present disclosure. The method shown in FIG. 4 may include following operations.

At block 401, a distance between a face and the mobile terminal may be acquired through a proximity sensor of the mobile terminal.

At block 402, a target biometric identification module may be determined.

At block 403, a target matching threshold corresponding to the target biometric identification module may be determined based on the distance, and a matching threshold of the target biometric identification module may be adjusted to the target matching threshold.

At block 404, biometric information may be collected through the target biometric identification module.

At block 405, a matching value between the biometric information and predefined biometric information may be acquired.

At block 406, a predefined biometric identification module may be initiated when the matching value is less than the target matching threshold and greater than a predefined target threshold.

In an embodiment, the method may further include: acquiring a second absolute value of a difference value between the matching value and the target matching threshold; and determining the predefined biometric identification module based on the second absolute value.

In the present embodiment, a mapping relation between the second absolute value and the predefined biometric identification module may be stored in advance. The second absolute value of the difference between the matching value and the target matching threshold may be acquired at first, and then the predefined biometric identification module may be determined based on the mapping relation and the second absolute value, such that the accuracy of determination of the predefined biometric identification module may be improved.

According to the method of unlocking control shown in FIG. 4, the distance between the face and the mobile terminal may be acquired. After determining the target biometric identification module, the matching threshold of the target biometric identification module may be adjusted to the target matching threshold. In such a way, the matching threshold may be modified dynamically, improving security. When the matching value between the biometric information collected through the target biometric identification module and the predefined target threshold is less than the target matching threshold and greater than the predefined target threshold, the predefined biometric identification module may be initiated. Unlocking of the predefined biometric identification module may be controlled, further improving the verification rate and flexibility of unlocking.

Figure 5:
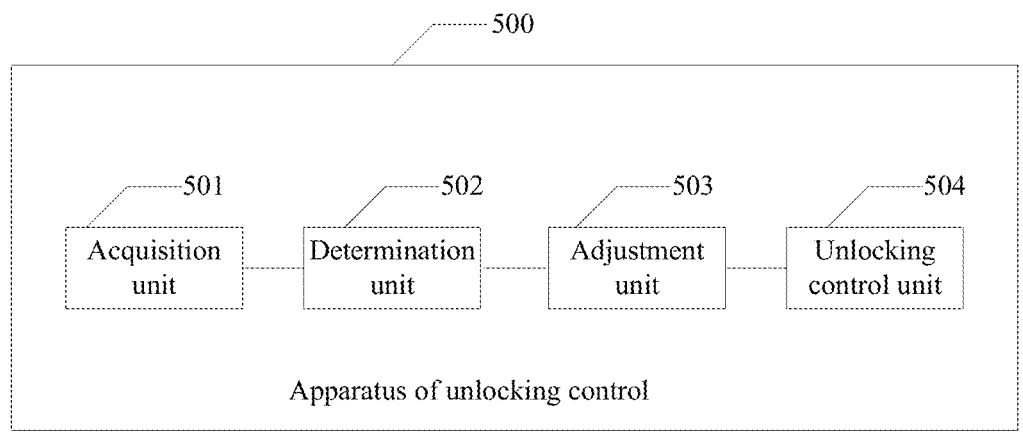
FIG. 5 is a structural diagram of an apparatus for unlocking control according to an embodiment of the present disclosure.

In accordance with the embodiment shown in FIG. 1, FIG. 5 is a structural diagram of an apparatus for unlocking control according to an embodiment of the present disclosure. The apparatus for unlocking control 500 may include an acquisition unit 501, a determination unit 502, an adjustment unit 503, and an unlocking control unit 504.

The acquisition unit 501 may be configured to acquire a distance between a face and a mobile terminal through a proximity sensor of the mobile terminal.

The determination unit 502 may be configured to determine a target biometric identification module. The target biometric identification module may be any biometric identification module of a current biometric identification apparatus and has the matching threshold to be adjusted. The determination unit 502 may further be configured to determine a target matching threshold corresponding to the target biometric identification module based on the distance.

The adjustment unit 503 may be configured to adjust a matching threshold of the target biometric identification module to the target matching threshold.

The unlocking control unit 504 may be configured to control the unlocking based on the target matching threshold.

According to the apparatus of unlocking control shown in FIG. 5, the distance between the face and the mobile terminal may be acquired. After determining the target biometric identification module, the matching threshold of the target biometric identification module may be adjusted to the target matching threshold based on the distance. In such a way, the matching threshold may be modified dynamically, and the unlocking may be controlled based on the target matching threshold, such that the identification rate and flexibility of the unlocking may be improved.

It may be understood that, a function of each programmatic module of the apparatus of unlocking control in the present embodiment may be achieved through the operations illustrated in the above method-related embodiment. Achievement of the function may refer to the description of the above method-related embodiment, and will not be repeatedly described herein.

Figure 6:
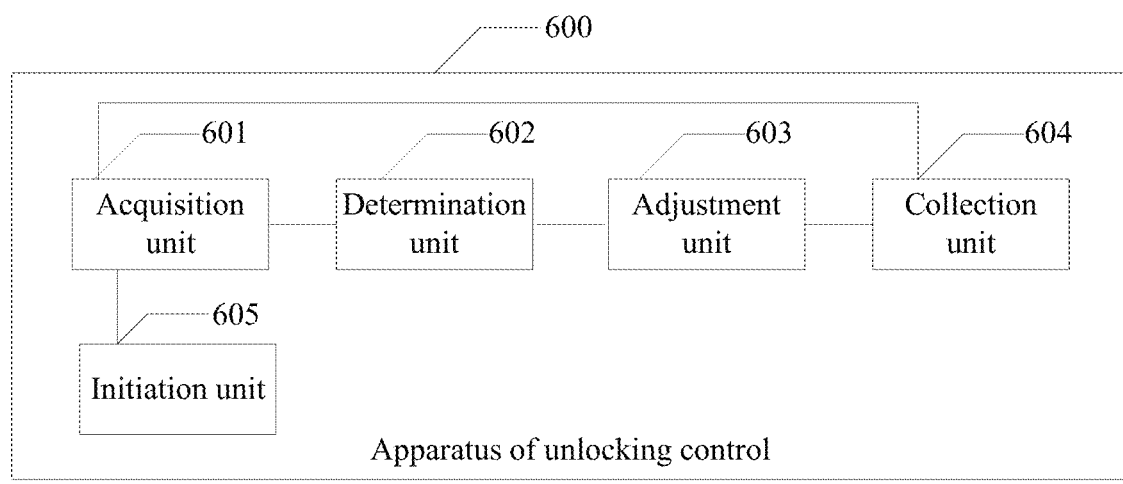
FIG. 6 is a structural diagram of another apparatus for unlocking control according to an embodiment of the present disclosure.

In accordance with the embodiment shown in FIG. 1, FIG. 6 is a structural diagram of another apparatus for unlocking control according to an embodiment of the present disclosure. The apparatus for unlocking control 600 may include following units.

An acquisition unit 601 may be configured to acquire a distance between a face and a mobile terminal through a proximity sensor of the mobile terminal.

A determination unit 6002 may be configured to determine a target biometric identification module. The target biometric identification module may be any biometric identification module of a current biometric identification apparatus and has the matching threshold to be adjusted. The determination unit 602 may further be configured to determine a target matching threshold corresponding to the target biometric identification module based on the distance.

An adjustment unit 603 may be configured to adjust a matching threshold of the target biometric identification module to the target matching threshold.

A collection unit 604 may be configured to collect biometric information through the target biometric identification module.

The acquisition module 601 may further be configured to acquire a matching value between the biometric information and predefined biometric information.

An initiation unit 605 may be configured to initiate the predefined biometric identification module when the matching value is less than the target matching threshold and greater than a predefined target threshold. The predefined target threshold may be less than the target matching threshold.

In an embodiment, the acquisition unit 601 may further be configured to: acquire L verification records of the target biometric identification module at the acquired distance from a verification history; and acquire L matching values corresponding to each of the L verification records. The determination module 602 may specifically be configured to determine the target matching threshold based on the L matching values. L is an integer greater than 1.

In an embodiment, the acquisition unit 601 may further be configured to acquire a first absolute value of a difference value between a predefined distance of the target biometric identification module and the distance. The determination unit 602 may specifically be configured to determine the target matching threshold based on the first absolute value.

In an embodiment, the acquisition unit 601 may further be configured to acquire an environment parameter through an environment sensor. The determination unit 602 may specifically be configured to determine the target biometric identification module based on the environment parameter.

In an embodiment, the acquisition unit 601 may further be configured to acquire a scene parameter of the mobile terminal. The determination unit 602 may specifically be configured to determine the target biometric identification module based on the scene parameter and the environment parameter.

In an embodiment, the acquisition unit 601 may further be configured to acquire verification records of the target biometric identification module corresponding to each scene parameter and each environment parameter from the verification history, obtaining M verification records; and acquire N verification records each having the matching value greater than the target threshold from the M verification records. M is an integer greater than 1, and N is a positive integer less than M. The determination unit 602 may specifically be configured to determine the predefined distance based on the distance corresponding to each of the N verification records.

In an embodiment, the determination unit 602 may further be configured to acquire a second absolute value of a difference value between the matching value and the target matching threshold, and to determine the predefined biometric identification module based on the second absolute value.

According to the apparatus of unlocking control shown in FIG. 6, the distance between the face and the mobile terminal may be acquired. After determining the target biometric identification module, the matching threshold of the target biometric identification module may be adjusted to the target matching threshold based on the distance. In such a way, the matching threshold may be modified dynamically to improve security. When the matching value between biometric information collected through the target biometric identification module and the predefined target threshold is less than the target matching threshold and greater than the predefined target threshold, the predefined biometric identification module may be initiated. By controlling the unlocking of the predefined biometric identification module, the identification rate and flexibility of the unlocking may further be improved.

Figure 7:
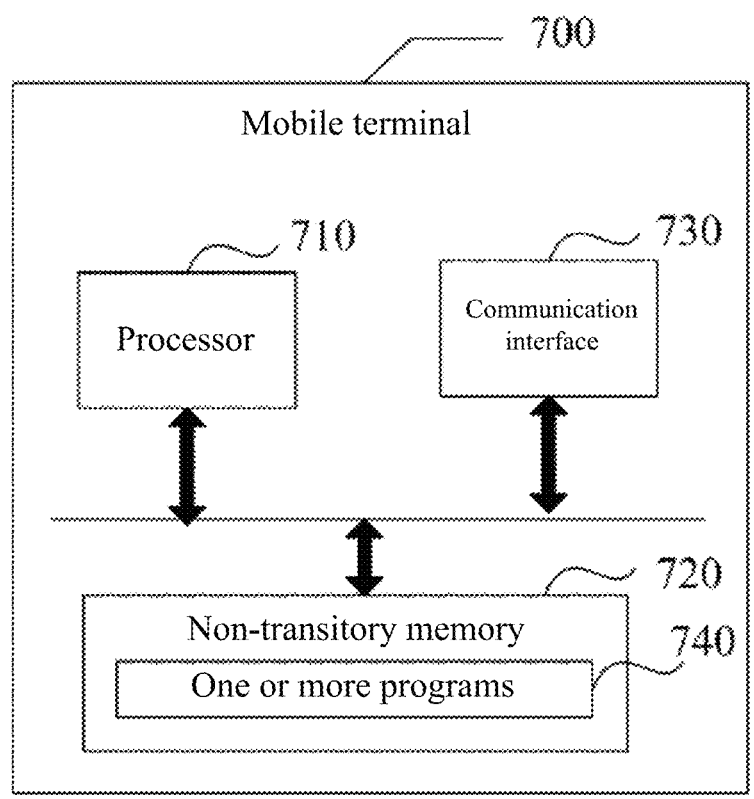
FIG. 7 is a structural diagram of another mobile terminal according to an embodiment of the present disclosure.

In accordance with the embodiment shown in FIG. 1, FIG. 7 is a structural diagram of another mobile terminal according to an embodiment of the present disclosure. As shown in FIG. 7, the mobile terminal 700 may include a processor 710, a non-transitory memory 720, a communication interface 730, and one or more program 740. The one or more program 740 may be stored in the non-transitory memory 720, and may be configured to be executed by the processor 710. The one or more program 740 may include an instruction for executing following operations.

A distance between a face and a mobile terminal may be acquired through a proximity sensor of the mobile terminal.

A target biometric identification module may be determined. The target biometric identification module may be any biometric identification module of a current biometric identification apparatus and has the matching threshold to be adjusted.

A target matching threshold corresponding to the target biometric identification module may be determined based on the distance, and a matching threshold of the target biometric identification module may be adjusted to the target matching threshold.

Unlocking may be controlled based on the target matching threshold.

According to the present embodiment, the distance between the face and the mobile terminal may be acquired. After determining the target biometric identification module, the matching threshold of the target biometric identification module may be adjusted to the target matching threshold based on the distance. The matching threshold may be modified dynamically, and the unlocking may be controlled based on the target matching threshold, improving the identification rate and flexibility of the unlocking.

In an embodiment, when determining the target matching threshold corresponding to the target biometric identification module based on the distance, the one or more program 740 may be configured to perform following operations.

L verification records of the target biometric identification module at the acquired distance may be acquired from a verification history. L may be an integer greater than 1.

L matching values corresponding to each of the L verification records may be acquired.

A target matching threshold may be determined based on the L matching values.

In an embodiment, when determining the target matching threshold corresponding to the target biometric identification module based on the distance, the one or more program 740 may be configured to perform following operations.

A first absolute value of a difference value between a predefined distance of the target biometric identification module and the distance.

The target matching threshold may be determined based on the first absolute value.

In an embodiment, when determining the target biometric identification module, the one or more program 740 may be configured to perform following operations.

An environment parameter may be acquired through an environment sensor.

The target biometric identification module may be determined based on the environment parameter.

In an embodiment, when determining the target biometric identification module based on the environment parameter, the one or more program 740 may be configured to perform following operations.

A scene parameter of the mobile terminal may be acquired.

The target biometric identification module may be determined based on the scene parameter and the environment parameter.

In an embodiment, the one or more program 740 may further be configured to perform following operations.

M Verification records of the target biometric identification module corresponding to each scene parameter and each environment parameter may be acquired from the verification history, and M may be an integer greater than 1.

N verification records each having the matching value greater than the target threshold may be acquired from the M verification records. N may be a positive integer less than M.

The predefined distance may be determined based on the distance corresponding to each of the N verification records.

In an embodiment, when controlling the unlocking based on the target matching threshold, the one or more program 740 may further be configured to perform following operations.

Biometric information may be collected through the target biometric identification module.

The matching value between the biometric information and predefined biometric information may be acquired.

A predefined biometric identification module may be initiated when the matching value is less than the target matching threshold and greater than a predefined target threshold. The predefined target threshold is less than the target matching threshold.

In an embodiment, the one or more program 740 may further be configured to perform following operations.

A second absolute value of a difference value between the matching value and the target matching threshold.

The predefined biometric identification module may be determined based on the second absolute value.

A computer non-transitory storage medium may be provided according to an embodiment of the present disclosure. The computer non-transitory storage medium may be configured to store a computer program. The computer program may enable the computer to perform some or all of the operations as described in the above-mentioned embodiments. The computer may include a mobile terminal.

A computer programmatic product may be provided according to an embodiment of the present disclosure. The computer programmatic product may include a computer-readable non-transitory storage medium having a computer program stored therein. The computer program may be executed to allow the computer to perform some of all of the operations as described in the above-mentioned embodiments. The computer programmatic product may be a software package, and the computer may include a mobile terminal.

To be noted that, in the above-mentioned embodiments illustrating the method of unlocking control, for the purposes of providing a concise description, the method may be illustrated as combination of a series of operations. However, the skilled in the art shall understand that the present disclosure is not limited by the sequence of describing the series of operations. According to the present disclosure, some operations may be performed in another sequence or at the same time. Further, the skilled in the art shall understand that the embodiments described herein are preferred embodiments, the operations and modules involved herein may not be necessary to the present disclosure.

Descriptions of the above embodiments may emphasize on various aspects. A portion that is not described in details in one of the embodiments may refer to other embodiments having relative descriptions.

In some embodiments of the present disclosure, it should be understood that, the disclosed apparatus may be realized in another form. For example, the apparatus described in the above embodiments may be examples. For example, the units may be defined based on logical functions. In an actual scenario, the units may be defined by other means. For example, a plurality of units or assemblies may be combined or integrated into another system, or some features may be omitted or unexecuted. In addition, mutual coupling or direct coupling or communicative connection shown or discussed herein may be achieved through some interfaces. Indirect coupling or communicative connection between the apparatus or units may be electrical or in other forms.

The units described as separate components may or may not be physically separate, and the components shown as units may or may not be physical units. That is, the units may be located in one place, or may be distributed to multiple network units. Some or all of the units may be selected according to actual needs to achieve the purposes of the solutions of the present embodiment.

In addition, each functional unit in each embodiment of the present application may be integrated into one processing unit, or each functional unit may be physically separated, or two or more units may be integrated into one unit. The integrated unit can be realized either in hardware or in a form of a software functional unit.

When the integrated unit is realized as a software functional unit and sold or used as an independent product, the integrated unit may be stored in a computer readable non-transitory memory. Based on such understanding, essence of technical solutions of the present disclosure, or a portion of the technical solutions having contribution to the prior art, or all or part of the technical solutions may be realized in a form of a software product, and the software product may be stored in a non-transitory memory. The software product may include a number of instructions to cause a computer device (the computer device may be a personal computer, a server, a network device, and the like) to perform all or part of the operations of the above-mentioned embodiments of the present disclosure. The foregoing non-transitory memory may be a medium able to store programmatic codes, including: a Universal Serial Bus (USB) flash disc, a read-only memory (ROM), a random access memory (RAM), a mobile hard disk, a magnetic disk, or an optical disk, and the like.

The ordinary skilled in the art shall understand that all or part of the operations of the embodiments may be completed by a program to instruct related hardware. The program can be stored in a computer readable non-transitory memory, and the non-transitory memory may include: a flash drive, a read-only memory, a random access memory, a magnetic disk, an optical disk, or the like.

The embodiments of the present application are described in details. The principles and implementations of the present disclosure are described through specific examples. The description of the above embodiments is for the purposes to understand the method and core ideas of the present disclosure. An ordinary skilled in the art may perform modification on the specific embodiments and the scope of application based on the idea of the present disclosure. In summary, content of the present specification should not be construed as limiting the present disclosure.

What is claimed is:

1. A method of unlocking control, adapted to a mobile terminal configured with a biometric identification apparatus, and the method comprising:
   acquiring a distance between a face of a user and the mobile terminal through a proximity sensor of the mobile terminal;
   determining a target biometric identification module, wherein the target biometric identification module is any biometric identification module of the biometric identification apparatus and has a matching threshold to be adjusted;
   determining a target matching threshold corresponding to the target biometric identification module based on the acquired distance, adjusting the matching threshold of the target biometric identification module to the target matching threshold; and
   controlling the unlocking based on the target matching threshold,
   wherein the determining the target matching threshold corresponding to the target biometric identification module based on the acquired distance comprises:
      acquiring L verification records of the target biometric identification module at the acquired distance from a verification history, wherein L is an integer greater than 1;
      acquiring L matching values corresponding to each of the L verification records; and
      determining the target matching threshold based on the L matching values.

2. The method according to claim 1, wherein the determining the target matching threshold corresponding to the target biometric identification module based on the acquired distance comprises:
   acquiring a first absolute value of a difference value between a predefined distance of the target biometric identification module and the acquired distance; and
   determining the target matching threshold based on the first absolute value.

3. The method according to claim 2, wherein the determining the target biometric identification module comprises:
   acquiring an environment parameter through an environment sensor of the mobile terminal; and
   determining the target biometric identification module based on the environment parameter.

4. The method according to claim 3, wherein the determining the target biometric identification module further comprises:
   acquiring a scene parameter of the mobile terminal; and
   determining the target biometric identification module based on the scene parameter and the environment parameter.

5. The method according to claim 4, wherein the method further comprises:
   acquiring M verification records of the target biometric identification module corresponding to the scene parameter and the environment parameter from a verification history, wherein M is an integer greater than 1;
   acquiring N verification records each having a matching value greater than a target threshold from the M verification records, wherein N is a positive integer less than M; and
   determining the predefined distance based on the acquired distance corresponding to each of the N verification records.

6. The method according to claim 1, wherein the controlling the unlocking based on the target matching threshold comprises:
   collecting biometric information through the target biometric identification module;
   acquiring a matching value between the biometric information and predefined biometric information; and
   initiating predefined biometric identification module for verification when the matching value is less than the target matching threshold and greater than a predefined target threshold, wherein the predefined target threshold is less than the target matching threshold.

7. The method according to claim 6, wherein the method further comprises:
   acquiring a second absolute value of a difference value between the matching value and the target matching threshold; and
   determining the predefined biometric identification module based on the second absolute value.

8. The method according to claim 1, wherein in the determining the target matching threshold based on the L matching values, the target matching threshold is determined to be one of a mean of the L matching values, a minimum value of the L matching values, and a matching value corresponding to a longest time consumed for verification in the L matching values.

9. A mobile terminal, comprising a processor, a proximity sensor connected to the processor, a non-transitory memory, a target biometric identification module, and an environment sensor connected to the processor, wherein the target biometric identification module is any biometric identification module of a current biometric identification apparatus and has a matching threshold to be adjusted, wherein the proximity sensor is configured to acquire a distance between a face of a user and the mobile terminal, wherein the environment sensor is configured to acquire an environment parameter, wherein the non-transitory memory is configured to store the matching threshold corresponding to the target biometric identification module, and wherein the processor is configured to:
  determine a target matching threshold corresponding to the target biometric identification module based on the acquired distance;
  adjust the matching threshold of the target biometric identification module to the target matching threshold;
  control unlocking based on the target matching threshold;
  acquire a scene parameter of the mobile terminal;
  acquire M verification records of the target biometric identification module corresponding to the scene parameter and the environment parameter from the verification history, wherein M is an integer greater than 1;
  acquire N verification records having a matching value greater than a target threshold from the M verification records, wherein N is a positive integer less than M; and
  determine a predefined distance based on the acquired distance corresponding to each of the N verification records.

10. The mobile terminal according to claim 9, wherein the non-transitory memory is further configured to store a verification history; and
  when determining the target matching threshold corresponding to the target biometric identification module based on the acquired distance, the processor is configured to:
    acquire L verification records of the target biometric identification module at the acquired distance from the verification history, wherein L is an integer greater than 1;
    acquire L matching values corresponding to each of the L verification records; and
    determine the target matching threshold based on the L matching values.

11. The mobile terminal according to claim 9, wherein the non-transitory memory is further configured to store a predefined distance of the target biometric identification module; and
  when determining the target matching threshold corresponding to the target biometric identification module based on the acquired distance, the processor is configured to:
    acquire a first absolute value of a difference value between the predefined distance and the acquired distance; and
    determine the target matching threshold based on the first absolute value.

12. The mobile terminal according to claim 11, wherein the processor is further configured to determine the target biometric identification module based on the environment parameter.

13. The mobile terminal according to claim 12, wherein the processor is further configured to determine the target biometric identification module based on the scene parameter and the environment parameter.

14. The mobile terminal according to claim 9, wherein
  the non-transitory memory is further configured to store a predefined target threshold, a predefined biometric identification module corresponding to the target biometric identification module, and predefined target biometric information corresponding to the target biometric identification module, wherein the predefined target threshold is less than the target matching threshold;
  the target biometric identification module is configured to collect biometric information; and
  when the processor is configured to control unlocking based on the target matching threshold, the processor is further configured to:
    acquire the matching value between the biometric information and the predefined biometric information; and
    initiate the predefined biometric identification module for verification when the matching value is less than the target matching threshold and greater than the predefined target threshold.

15. The mobile terminal according to claim 9, wherein the target matching threshold is determined to be one of a mean of the L matching values, a minimum value of the L matching values, and a matching value corresponding to a longest time consumed for verification in the L matching values.

16. A computer-readable non-transitory storage medium, configured to store a computer program, wherein the computer program enables the computer to execute operations of:
  acquiring a distance between a face of a user and a mobile terminal through a proximity sensor of the mobile terminal;
  storing a target matching threshold corresponding to a target biometric identification module according to the detected distance;
  controlling unlocking based on the target biometric identification module and the target matching threshold;
  acquiring an environment parameter and a scene parameter of the mobile terminal;
  acquiring M verification records of the target biometric identification module corresponding to the scene parameter and the environment parameter from the verification history, wherein M is an integer greater than 1;
  acquiring N verification records having a matching value greater than a target threshold from the M verification records, wherein N is a positive integer less than M; and
  determining a predefined distance based on the acquired distance corresponding to each of the N verification records.

17. The computer-readable non-transitory storage medium according to claim 16, wherein the target matching threshold is determined by: acquiring L verification records of the target biometric identification module at the acquired distance from a verification history, wherein L is an integer greater than 1;
  acquiring L matching values corresponding to each of the L verification records; and
  determining the target matching threshold based on the L matching values.

18. The computer-readable non-transitory storage medium according to claim 16, wherein the target matching threshold is determined by:
- acquiring a first absolute value of a difference value between a predefined distance of the target biometric identification module and the acquired distance; and
- determining the target matching threshold based on the first absolute value.

* * * * *